US009009769B2

(12) United States Patent
Kesireddy et al.

(10) Patent No.: US 9,009,769 B2
(45) Date of Patent: Apr. 14, 2015

(54) AUTOMATIC DETECTION AND REMOTE REPAIR OF A TELEVISION SYSTEM CONDITION (75) Inventors: Manohar R. Kesireddy, Plano, TX (US); Anil Guntupalli, Waltham, MA (US); Virendra P. Shah, Irving, TX (US); Huajun Shi, Irving, TX (US); Sudarshan Chavva, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1027 days.

(21) Appl. No.: 12/722,321

(22) Filed: Mar. 11, 2010

(65) Prior Publication Data
US 2011/0225619 A1 Sep. 15, 2011

(51) Int. Cl.
| *H04N 7/173* | (2011.01) |
| *H04N 17/00* | (2006.01) |
| *H04N 21/258* | (2011.01) |
| *H04N 21/442* | (2011.01) |
| *H04N 21/443* | (2011.01) |
| *H04N 21/658* | (2011.01) |

(52) U.S. Cl.
CPC ............ *H04N 17/004* (2013.01); *H04N 7/173* (2013.01); *H04N 21/25808* (2013.01); *H04N 21/4424* (2013.01); *H04N 21/443* (2013.01); *H04N 21/6582* (2013.01)

(58) Field of Classification Search
CPC ..... H04N 17/00; H04N 17/004; H04N 17/02; H04N 17/04; H04N 17/045; H04N 17/06
USPC .................... 725/107; 714/4.4, 6.31; 348/180
See application file for complete search history.

(56) References Cited

U.S. PATENT DOCUMENTS

| 2005/0081118 | A1* | 4/2005 | Cheston et al. ................. 714/47 |
| 2007/0006014 | A1* | 1/2007 | Huang ............................... 714/2 |
| 2007/0019617 | A1* | 1/2007 | Hancock et al. ............. 370/352 |
| 2009/0164853 | A1* | 6/2009 | Gokhale et al. ................ 714/57 |
| 2010/0054136 | A1* | 3/2010 | Mehta et al. ................. 370/245 |
| 2011/0225609 | A1* | 9/2011 | Li et al. ........................... 725/38 |

* cited by examiner

Primary Examiner — Yassin Alata (57) ABSTRACT

A server device is configured to store quick code information, where the quick code information includes a particular operation of a group of operations and a particular condition code of a group of condition codes; receive diagnostic information from a video client, of a group of video clients, where the diagnostic information includes a condition code that corresponds to a condition associated with the video client; determine that the condition code matches the particular condition code of particular, stored quick code information; determine, from the particular quick code information, the particular operation corresponding to the particular condition code; perform an automatic remote repair to remedy the condition, on the video client, based on the particular operation; and send, to the video client, a notification that the condition has been remedied based on the automatic remote repair when the automatic remote repair remedies the condition on the video client.

25 Claims, 6 Drawing Sheets

AUTOMATIC DETECTION AND REMOTE REPAIR OF A TELEVISION SYSTEM CONDITION

BACKGROUND

Service providers are delivering an increasing amount and variety of television content, over broadband networks, to an ever-growing number of users. Broadband network are expanding infrastructures to meet the growing demand to deliver and manage a growing array of television content, such as new television channels, television programs, Video on Demand (VoD) titles, and/or television services intended to enhance the television viewing experience.

Service providers often rely on the user to identify, report, and diagnose system conditions associated with the delivery of television content and services. Consequently, when the user encounters a system condition, the user will usually call a customer service agent associated with the service provider, attempt to describe the nature of the system condition, and perform troubleshooting based on instructions received from the customer service agent. It is sometimes difficult, however, for the user to accurately describe the system condition encountered, to understand the instructions received from the customer service agent, or to perform the instructions to correct the system condition.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may include systems and/or methods that provide for automatic detection and remote repair of a television system condition using a technique that can automatically detect a television system condition and can automatically perform a remote repair operation to correct the television system condition (hereinafter, referred to as "system condition"). Additionally, or alternatively, automatic detection and remote repair of a system condition may enable a system condition to be detected and/or corrected without involving a customer service agent and/or a user in the processes of detecting the system condition, describing the system condition, troubleshooting the system condition and/or remedying the system condition.

As described herein, an interactive menu guide application (hereinafter referred to as a "menu guide application") may include software that performs an automatic diagnostic operation to determine whether a system condition exists corresponding to a video client (e.g., set top box (STB)) and/or a television system associated with the video client. For example, if a system condition is detected, then the menu guide application, hosted by the video client, may perform a local repair operation to troubleshoot and/or remedy the system condition.

If, however, the menu guide application is unable to remedy the system condition, then the video client may send diagnostic information to a voice portal that may perform additional and/or different operations to remedy the system condition. Additionally, or alternatively, the video client may display a notification, on a video display device, that informs the user that a system condition has been detected. The notification may include information describing the particular system condition, instructions on how to contact the voice portal, and/or quick code information. The quick code information may include a particular television channel with which the system condition is associated and/or a condition code, associated with the particular system condition, assigned by the menu guide application as a result of the diagnostic operation. The user may contact the voice portal by pressing a particular button on a remote control associated with the video client or may call the voice portal using a telephone number displayed as part of the notification. Alternatively, the voice portal may perform an automatic remote repair operation regardless of whether the user contacts the voice portal.

As further described herein, a voice portal application may perform an automatic remote repair operation to remedy the system condition. For example, the voice portal application, hosted by a voice portal server, may receive the diagnostic information and the quick code information from a particular video client. The voice portal application may retrieve condition code information from memory and, from the condition code information, may determine which corrective operation to perform to remedy the system condition. However, it is possible that the voice portal application may not be able to remedy the system condition via the automatic remote repair operation. Therefore, in the event that the voice portal application cannot remedy the system condition, the voice portal application may get the user and/or a customer service agent involved in troubleshooting and/or remedying the system condition.

As used herein, the term "television content" may include any video content, audio content, and textual content capable of being displayed on a video display device, such as a television and/or played on an audio device, such as the speakers of the television. For example, television content may include broadcast television content, Internet content, streaming video content, streaming audio content, Video on Demand (VoD) content, programming information (e.g., menu guide information, etc.), interactive television content and/or advertising content. The term "menu guide application," as used herein, need not present a menu guide and may include software that is hosted on a video client that may perform a diagnostic operation to detect the presence of a system condition, may perform a local repair operation to remedy a system condition, may present a notification to a video display device for display, and/or may send information to a voice portal.

Figure 1:
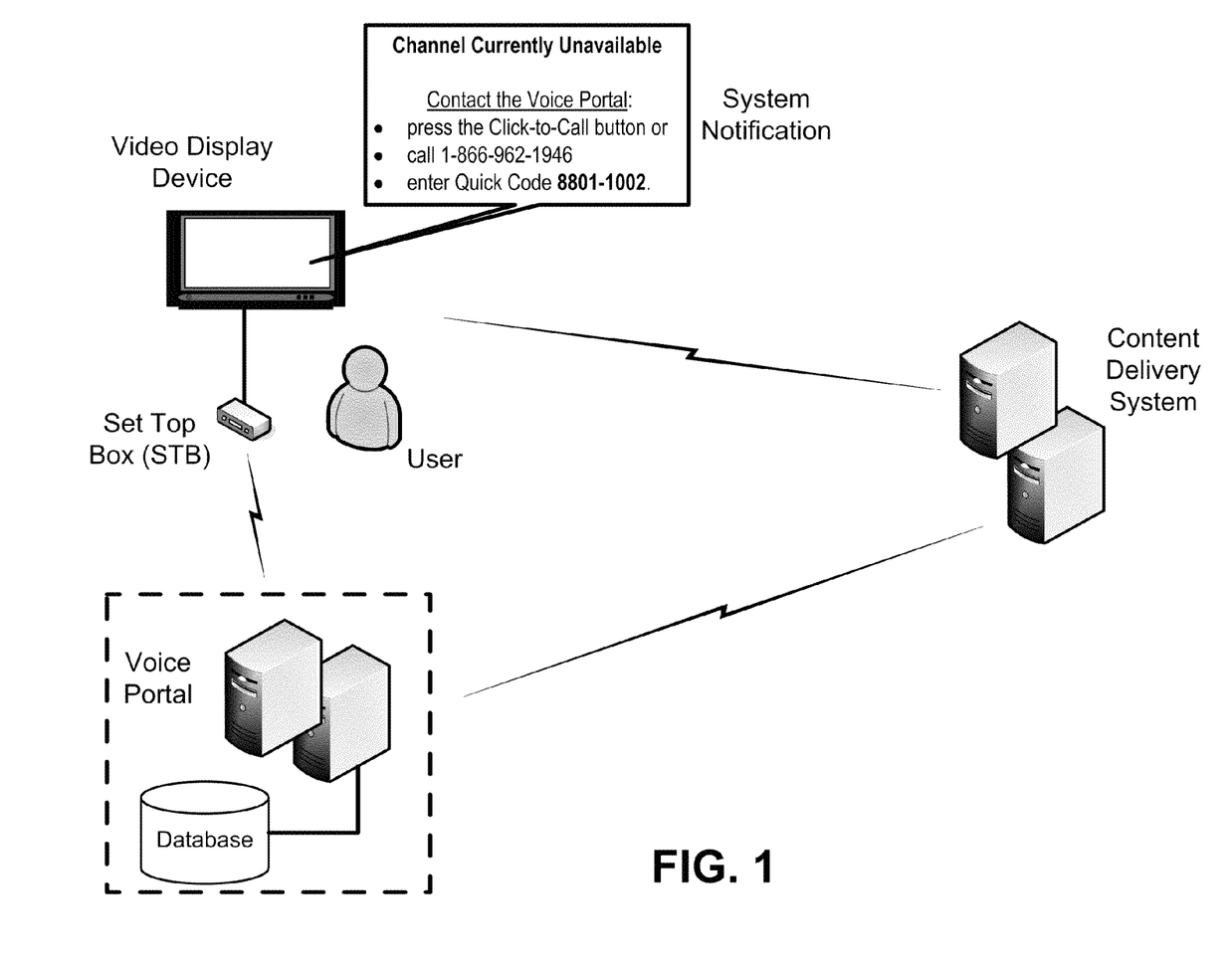
FIG. 1 is a diagram that illustrate an overview of an automatic detection and remote repair of a television system condition implementation described herein.

FIG. 1 is a diagram that illustrates an overview of an automatic detection and remote repair of a television system condition implementation described herein. As shown in FIG.

1, a STB may be connected to a content delivery system and may receive television content via the content delivery system. The STB may be connected to a video display device (e.g., a television, a computer monitor, etc.) and may present television content to the video display device for display so that that the television content may be viewed by a user. The STB may be connected to a voice portal that may include a server device that hosts a voice portal application. The voice portal application may perform automatic remote repair operations to remedy system conditions associated with the television system. The content delivery system may be connected to television content providers to receive television content (e.g., television channels, VoD, advertising, etc) and may forward the television content to the STB. The STB may host a menu guide application that may enable the user to interact with various menus, displayed on the video display device, so that the user may view desired television content and/or use other services provided by the television system.

The menu guide application may perform automatic diagnostic operations to determine whether a system condition exists that may be associated with the television system. For example, the menu guide application may perform an automatic diagnostic operation and may verify STB connectivity to telephone lines and/or the Internet. The menu guide application may detect the presence of a network condition associated with a telephone service and/or Internet service and may generate a notification for display on the video display device. The notification may instruct the user to contact the telephone service provider and/or the Internet service provider to correct the network condition associated with the telephone system and/or the Internet service, respectively.

The menu guide application may perform an automatic local repair operation. For example, the menu guide application may detect the presence of a system condition associated with the television system (e.g., STB, and/or other devices associated with the television system) and/or the television content, received on a particular channel from a television content provider and/or retrieved from a VoD database, via the content delivery system. The menu guide application may check connectivity with the content delivery system to ensure that television content is being received on a particular channel and/or a series of channels. Additionally, or alternatively, the menu guide application may perform an automatic diagnostic operation to ensure that the STB is functioning properly and is able to receive television content and/or other information, is able process television content, and/or is able to present television content for display on the video display device. If the menu guide application determines that a system condition exists, then the menu guide application may perform an automatic local repair operation to remedy the system condition.

If, however, the menu guide application is unable to remedy the system condition, the menu guide application may generate a system notification, for display on the video display device, to inform the user that a system condition exists. As illustrated in FIG. 1, the system notification may include an indication that a system condition exists (e.g., "Channel Currently Unavailable"), instructions on how to contact the voice portal (e.g., "press the Click-to-Call button" on a remote control device and/or call the voice portal telephone number, etc.), and quick code information (e.g., "Quick Code 8801-1002"). The menu guide application may send the information associated with the diagnostic operation, such as the quick code information and/or information associated with the particular STB to the voice portal.

The voice portal may receive diagnostic information from the STB. For example, the voice portal may receive diagnostic information from the STB that detected a system condition and may automatically perform an automatic diagnostic operation. The diagnostic information may include information associated with the STB, quick code information and/or other information, obtained by the STB, from the automatic diagnostic operation. In another example, the voice portal application may wait to receive a signal (e.g., via the STB) and/or a call from the user, to authenticate the STB and/or the user prior to performing the automatic diagnostic operation.

The voice portal application may perform an automatic remote repair operation. For example, the voice portal application may obtain, from the quick code information, a particular system condition code (e.g., 8801) and may retrieve, from a memory, condition code information that corresponds to the particular system condition code. From the condition code information, the voice portal application may determine which particular corrective operation (e.g., reset, refresh, reinitialize, etc.) to perform to remedy the system condition. The voice portal application may perform the particular corrective operation that corresponds to the condition code received from the STB.

If, however, the corrective operation does not remedy the system condition, then the voice portal application may cause a notification to be sent to the STB, for display on the video display device, notifying the user that the system condition is not resolved and that the user will be automatically connected to a customer service agent.

The automatic detection and remote repair of a system condition may enable a system condition to be remedied without involving the user and/or a customer service agent. If a system condition is detected, the system condition may be remedied, by the video client and/or the voice portal, in a manner that is transparent to the user. If the video client and/or voice portal is unable to remedy the system condition, then the user may be automatically connected with a customer service agent. The user may be prompted, by the customer service agent, to provide condition code information rather than being burdened with participating in the process of detecting, describing, and/or troubleshooting the system condition.

Figure 2:
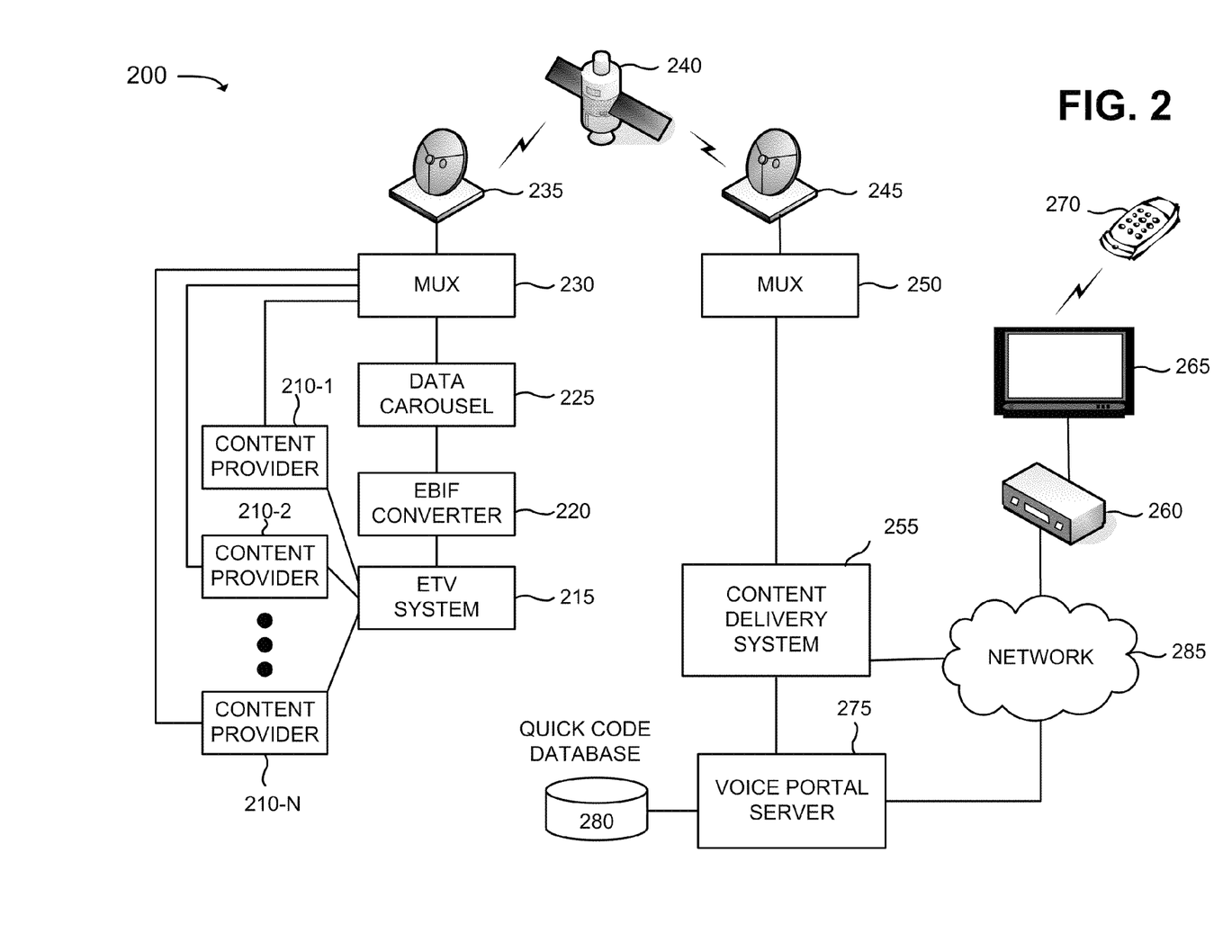
FIG. 2 is a diagram of an exemplary network in which systems and/or methods described herein may be implemented.

FIG. 2 is a diagram of an exemplary environment 200 in which systems and/or methods described herein may be implemented. As shown in FIG. 2, environment 200 may include television content providers 210-1, 210-2, . . . , 210-N (where N≥1) (collectively referred to as "content providers 210" and individually as "content provider 210"), Enhanced Television (ETV) system 215, Enhanced TV Binary Interchange Format (EBIF) converter 220, data carousel 225, multiplexer (MUX) 230, satellite uplink 235, satellite 240, satellite downlink 245, MUX 250, content delivery system 255, video client 260, video display device 265, remote control 270, voice portal server 275, quick code database 280 and network 285. In practice, environment 200 may include additional devices, fewer devices, different devices, or differently arranged devices than are shown in FIG. 2. For example, environment 200 may include a transmission medium that includes devices other than satellites and satellite uplinks and downlinks.

Also, two or more of these devices may be implemented within a single device, or a single device may be implemented as multiple, distributed devices. Further, while FIG. 2 shows direct connections between devices, any of these connections can be indirectly made via a network, such as a local area network, a wide area network (e.g., the Internet), a telephone network (e.g., the Public Switched Telephone Network (PSTN) or a cellular network), an ad hoc network, a fiber optic network (e.g., a fiber optic service (FiOS) network), or a combination of networks.

Content providers 210 may include any type or form of content providers. For example, content providers 210 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., streaming content from web sites). Content providers 210 may produce media streams (e.g., television broadcasts). A "media stream," as used herein, may refer to stream of content that includes video content, audio content and/or text content.

ETV system 215 may include a device that may work with content providers 210 to generate interactive content for the media streams. ETV system 215 may acquire, decode, present information, and execute actions contained in an EBIF signal in order to present an interactive multimedia page for display to a user. For example, ETV system 215 may generate interactive content and associated signaling information (e.g., triggers) that are associated with the media streams. EBIF converter 220 may include a device that processes the interactive content and associated signaling information to conform to the EBIF standard. EBIF converter 220 may output EBIF-compliant content and signaling information. Data carousel 225 may include a device that processes the EBIF-compliant content and signaling information to generate multiple data carousels on multiple separate data packet identifiers (PIDs) as part of an MPEG-2 single program transport stream (SPTS). For example, a first PID may contain EBIF-compliant content and a second PID may contain the signaling information.

MUX 230 may include a multiplexer device that receives the media streams from content providers 210 and the EBIF-compliant content and associated signaling information from data carousel 225 and multiplexes or otherwise combines this data to create an enhanced media stream. Satellite uplink 235 may include a satellite transmitter that receives the enhanced media stream, processes the enhanced media stream for transmission, and transmits the enhanced media stream to satellite 240. Satellite 240 may include a stationary or orbiting communication satellite that receives the enhanced media stream and relays the enhanced media stream to satellite downlink 245.

Satellite downlink 245 may include a satellite receiver that receives the enhanced media stream from satellite 240, process the enhanced media stream for transmission, and transmit the enhanced media stream to MUX 250. MUX 250 may include a multiplexer device that processes the enhanced media stream for transmission to content delivery system 255.

Content delivery system 255 may include a device, or a collection of devices, that receives the enhanced media stream and processes the enhanced media stream for transmission, according a particular protocol, such as the asynchronous serial interface (ASI) format, to a user's equipment (e.g., video client 260). Content delivery system 255 may include a service adaptor component and a media relay component. The service adaptor component may control what information (e.g., what video programs and/or advertisements) to provide to which users based, for example, on user subscriptions and/or profiles. In another implementation, content delivery system 255 may communicate with one or more other devices, such as voice portal server 275 and/or video client 260 to determine whether television content is being received from content providers 210 and/or whether television content is being transmitted to video client 260. Content delivery system 255 may store an out-of-service channel list that contains a channel, or set of channels that content delivery system 255 determines are not being received from content providers 210 and/or are not being provided to one or more video clients 260. Content delivery system 255 may receive notifications from voice portal server 275 and may forward notifications to video client 260 for display on video display device 265.

The media relay component may control the transmission of the information to the users (e.g., video client 260). The media relay component may perform multiplexing, demultiplexing, encoding, and/or encryption functions. The media relay component may include a multiplexer component that performs some form of modulation on the enhanced media stream, such as quadrature amplitude modulation (QAM).

Video client 260 may include a device that can receive and process the enhanced media stream from content delivery system 255. In one implementation, video client 260 may take the form of a set-top box (STB). In another implementation, video client 260 may include a computer device, a cable card, a communication device (e.g., a telephone, such as a voice over Internet protocol (VoIP) telephone or a mobile telephone, or a personal digital assistant (PDA)), or the like.

Video client 260 may perform decoding and/or decryption functions on the enhanced media stream received from content delivery system 255. Video client 260 may host a media guide application that may enable video client 260 to perform an automatic diagnostic operation to determine whether a system condition, associated with environment 200, exists. Video client 260 may perform an automatic local repair operation if the media guide application determines that a system condition exists. Video client 260 may send diagnostic information, obtained as a result of the diagnostic operation, to voice portal server 275. Video client 260 may store condition code information that corresponds to a number of system condition types that may be detected as a result of the automatic diagnostic operation. Using the condition code information, video client 260 may assign condition codes to system conditions that are detected as a result of the automatic diagnostic operation and may send notifications, that include quick code information (e.g., channel information and/or condition code information), to video display device 265.

Video display device 265 may include any device capable of receiving and/or reproducing video and/or audio signals. In one implementation, video display device 265 may take the form of a television. In another implementation, video display device 265 may include a computer monitor, a display of a communication device (e.g., a telephone, such as a VoIP telephone or a mobile telephone, or a PDA), or the like. Video display device 265 may be connected to video client 260 and may receive signals from video client 260 containing television content for display.

Remote control 270 may include any device capable of remotely controlling the operation of video client 260 and/or video display device 265. Remote control 270 may take the form of a remote control device similar to a television or STB remote control device, a game controller, a keyboard, a keypad, a PDA, a mobile telephone, or the like. Remote control 270 may provide commands to video client 260 and/or video display device 265 by transmitting signals, such as wireless signals (e.g., infrared or Bluetooth) or signals transmitted over wires (e.g., over a universal serial bus (USB) interface or the like), to a reader associated with video client 260 and/or video display device 265.

Voice portal server 275 may include one or more server devices, or other types of computation or communication devices, that gather, process, search, store, and/or provide information in a manner similar to that described herein. Voice portal server 275 may interface with video client 260 via network 285, content delivery system 255, and/or quick code database 280. Voice portal server 275 may include a device that is capable of receiving diagnostic information and performing automatic remote repair operations to remedy system conditions. Voice portal server 275 may host a voice portal application that may enable voice portal server 275 to perform automatic remote repair operations to remedy system conditions, associated with environment 200.

Voice portal server 275 may receive diagnostic information and may determine which channel is associated with the diagnostic information. For example, voice portal server 275 may receive diagnostic information from video client 260 via network 285 and, from the quick code information obtained from the diagnostics information, may determine, using the voice portal application, with which channel a particular system condition is associated. Voice portal server 275 may communicate with content delivery system 255 to determine whether television content is being received from a particular content provider 210 associated with the channel. If television content, associated with the channel, is not being received by content delivery system 255, then voice portal server 275 may generate a notification indicating that the particular channel is temporarily out of service and may forward the notification to content delivery system 255 with an instruction to forward the notification to video client 260 for display on video display device 265.

Voice portal server 275 may perform an automatic remote repair operation to remedy a system condition. For example, voice portal server 275, using the voice portal application, may obtain the condition code information from the quick code information received with the diagnostic information. The voice portal application may retrieve quick code information associated with the condition code from a memory (e.g., quick code database 280) to determine which corrective operation (e.g., reset, refresh, reinitialize, etc.) corresponds to the quick code information. Voice portal server 275 may perform a particular corrective operation to remedy a particular system condition as specified by the condition code. If, however, the particular corrective operation does not remedy the particular system condition, voice portal server 275 may send a notification to content delivery system 255 with an instruction to forward the notification to video client 260 for display on video display device 265 notifying the user that the system condition is not resolved and/or that a customer service agent will be automatically connected to the user. In another implementation, the notification may include customer service agent contact information and may instruct the user to contact the customer service agent.

Quick code database 280 may include a device to receive write, read and/or store information. For example, quick code database 280 may store quick code information associated with automatic remote repair operations to be performed by voice portal server 275. The quick code information may include condition codes corresponding to system condition descriptions to be remedied by voice portal server 275. Additionally, or alternatively, the quick code information may include information associated with corrective operations, to be performed in order to remedy each system condition, that correspond to system condition descriptions.

Network 285 may include a single network or multiple networks. For example, network 285 may include a video signaling and distribution network, such as a fiber optic network, to distribute information and/or television content from content delivery system 255 and/or voice portal server 275. Additionally, or alternatively, network 285 may take the form of a wide area network, a local area network, an intranet, or a telephone network (e.g., the Public Switched Telephone Network or a cellular network).

Figure 3:
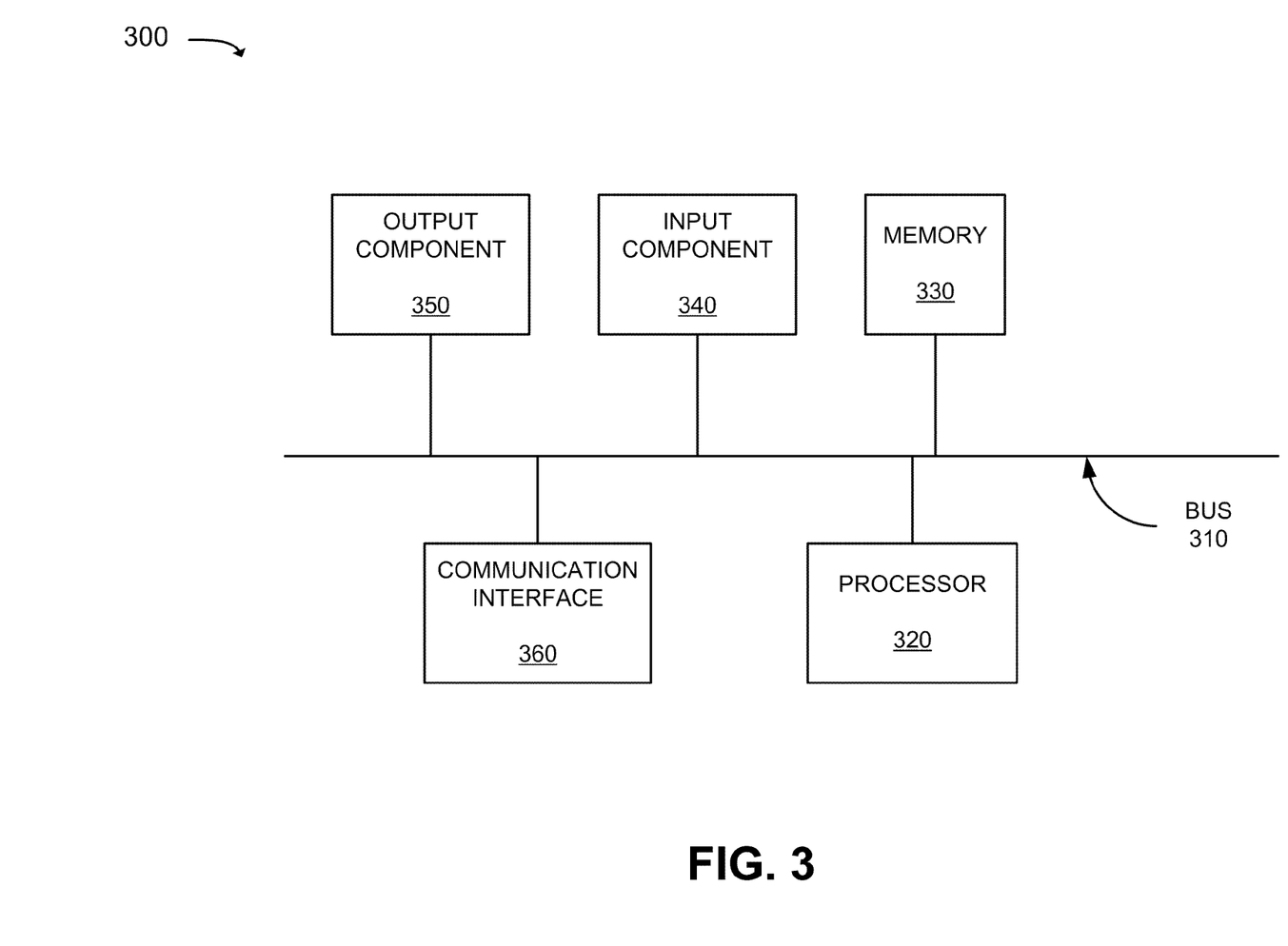
FIG. 3 is a diagram of exemplary components of one or more of the devices of FIG. 2.

FIG. 3 is a diagram of exemplary components of a device 300 that may correspond to content delivery system 255, video client 260, video display device 265, remote control 270 and/or voice portal server 275. Device 300 may include a bus 310, a processor 320, a memory 330, an input component 340, an output component 350, and a communication interface 360. In another implementation, device 300 may include additional components, fewer components, different components, or differently arranged components than are shown in FIG. 3.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems. For example, communication interface 360 may include an Ethernet interface, an optical interface, a coaxial interface, or the like.

As will be described in detail below, device 300 may perform certain operations relating to an automatic detection and remote repair of a system condition. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause to processor 320 to perform processes described herein. Alternatively, hardwired circuitry may be used in place of or in combination with software instructions to implement processes described herein. Thus, implementations described herein are not limited to any specific combination of hardware circuitry and software.

The software instructions may be read into memory 330 from another computer-readable medium or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
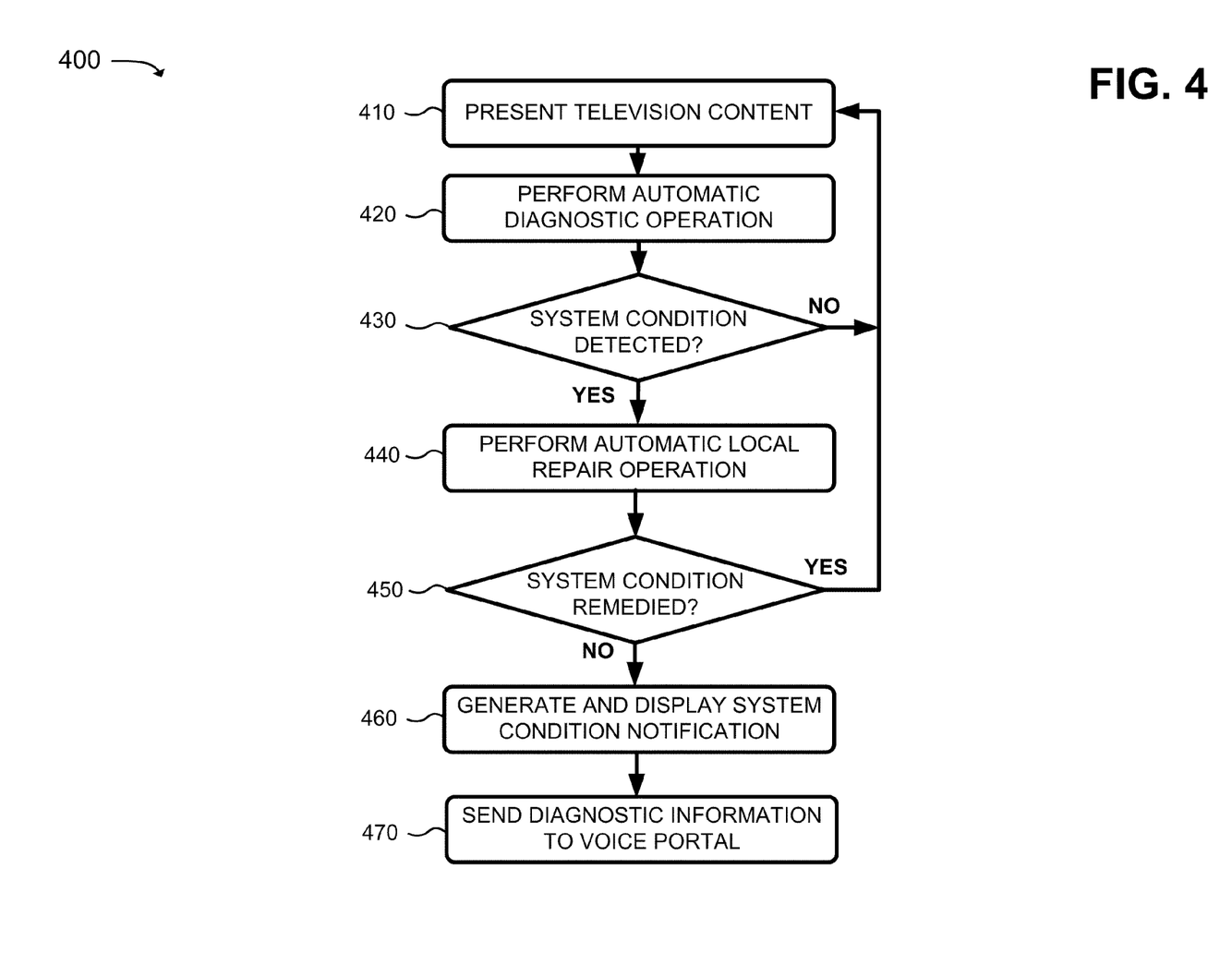
FIG. 4 is a flowchart of an exemplary process for an automatic diagnostic operation within an exemplary portion of the network of FIG. 2.

FIG. 4 is a flowchart of an exemplary process 400 for an automatic diagnostic operation within an exemplary portion of environment 200. In one implementation, some or all of process 400 may be performed by video client 260 interfacing with voice portal server 275, content delivery system 255, remote control 270, video display device 265 and/or other exemplary portions of environment 200. In another implementation, some or all of process 400 may be performed by one or more devices separate from, or in combination with, video client 260.

Process 400 of FIG. 4 may include presenting television content (block 410). For example, video client 260 may receive television content from content delivery system 255 and may present the television content to video display device 265 for display. Video client 260 may host a menu guide application and the menu guide application may be programmed to periodically perform an automatic diagnostic operation (e.g., every minute, every five minutes, every 30 minutes, a user-defined time period, etc.). In another example, a user of video client 260 may manually cause the diagnostic operation to be performed by selecting a button on video client 260 and/or by pressing a particular button on remote control 270. In still another example, voice portal server 275 and/or content delivery system 255 may send a signal to video client 260 to perform the diagnostic operation.

An automatic diagnostic operation may be performed (block 420). For example, the menu guide application may perform an automatic diagnostic operation to determine whether a system condition, associated with video client 260 and/or environment 200, exists. The menu guide application may perform the automatic diagnostic operation by checking the connection with content delivery system 255 (e.g., by transmitting a message and/or pinging content delivery system 255) to ensure that television content is being received. The menu guide application may check connectivity with remote control 270 to verify that the user is able to interact with video client 260 and/or with the television content being displayed on video display device 265. The menu guide application may perform a self-diagnostic test on video client 260 to verify that functions, associated with video client 260, are being performed properly, that television content is being received, being processed, and/or being presented to video client device 265 for display.

If a system condition is not detected (block 430—NO), then television content may be presented (block 410). For example, the menu guide application may perform the automatic diagnostic operation and may determine that a system condition does not exist. Based on the determination that a system condition does not exist, video client 260 may continue to present television content to video display device 265.

If a system condition is detected (block 430—YES), then an automatic local repair operation may be performed (block 440). The menu guide application may detect the presence of a system condition as a result of the automatic diagnostic operation. For example, the menu guide application may perform the automatic diagnostic operation to determine whether there is a network connection with content delivery system 255 and may determine that a system condition exists when television content is not being received from content delivery system 255 (e.g., when a return message and/or return ping is not received from content delivery system 255). In another example, menu guide application may perform a diagnostic operation that includes determining whether a channel or a set of channels may be acquired (e.g., locked on) by video client 260. If the channel, and/or set of channels, cannot be acquired, then the menu guide application may determine that a system condition exists. In yet another example, the menu guide application may perform the automatic diagnostic operation and may determine that video client 260 is malfunctioning due to a hardware fault (e.g., an electronic circuitry fault, power supply failure, etc.), a software glitch, and/or other malfunctions.

The menu guide application may perform an automatic local repair operation to remedy the system condition. In one example, video client 260 may perform a power cycle operation (e.g., powering down video client 260 for a particular time period that is followed by powering up video client 260). In another example, if the menu guide application determines that a channel or set of channels cannot be acquired and/or locked on, then video client 260 may communicate with content delivery system 255 to determine whether the particular channel or set of channels may be reacquired. In yet another example, if the menu guide application determines that a network connection, with content delivery system 255, has been lost, then video client 260 may display, on video display device 265, a notification with an instruction for the user to check one or more connections to determine whether the network connection, with content delivery system 255, can be restored. In still another example, the menu guide application may perform other automatic local repair operations to remedy the system condition associated with video client 260 that may be malfunctioning.

If the system condition is remedied (block 450—YES), then television content may be presented (block 410). For example, the menu guide application may determine that the system condition was remedied as a result of the local repair operation. In another example, the menu guide application may determine that the system condition was remedied as a result of the user checking connections and/or reestablishing the network connection with content delivery system 255 as a result of the instruction contained in the notification. In yet another example, the menu guide application may communicate with content delivery system 255 to determine whether a channel or a set of channels that cannot be acquired and/or locked on are out-of-service (e.g., television content that is not being received from content providers 210). In this example, content delivery system 255 may determine that the channel or set of channels, that cannot be acquired by video client 260, are included on the list of channels that are out-of-service. Content delivery system 255 may send a notification, to video client 260, for display on video display device 265, indicating that the channel or set of channels are out-of-service. Based on the determination that the system condition was remedied (e.g., that the network connection was reestablished, that video client 260 is functioning properly, and/or that the channel or set of channels are out-of-service), video client 260 may continue to present television content to video display device 265.

If the system condition is not remedied (block 450—NO), then a system condition notification may be generated and the system condition notification may be displayed (block 460). For example, the menu guide application may determine that the automatic local repair operation did not remedy the system condition. For example, the user may, in response to instructions associated with a lost network connection, check connections and the menu guide application may determine that the connection with content delivery system 255 is not restored. In another example, video client 260 may communicate with content delivery system 255 and may determine that the channel or set of channels, that cannot be acquired and/or locked on, are not included on the out-of-service list. In yet another example, the menu guide application may determine that, despite performing the local repair operation, video client 260 is continuing to malfunction.

The menu guide application may generate a system condition notification in a manner similar to that described above with respect to FIG. 1. For example, the system condition notification may include all or a portion of the diagnostic information obtained from the automatic diagnostic operation, such as information associated with the type of system condition (e.g., malfunctioning video client 260, channel unavailable, channel out-of-service, network connection lost, VoD errors, etc.), information associated with the channel with which the system condition is associated, and/or condition code information associated with the type of system condition detected. The menu guide application may obtain the condition code information, from a memory associated with video client 260, that corresponds to the particular type of system condition based on the automatic diagnostic operation. Video client 260 may present the system condition notification to video display device 265 for display to inform the user that a system condition exists.

Diagnostic information may be sent to voice portal server 275 (block 470). For example, based on the determination that the system condition could not be remedied by the automatic local repair operation, the menu guide application may instruct video client 260 to send diagnostic information to voice portal server 275. The diagnostic information may include quick code information (e.g., information associated with the channel with which the system condition is associated and/or condition code information associated with the type of system condition determined to exist), information associated with video client 260 (e.g., a device number, user information, etc.), and/or information associated with a user of video client 260 (e.g., username, password, PIN, telephone number, etc.).

The user of video client 260 may communicate with a customer service agent, associated with voice portal server 275, based on the system condition notification displayed on video display device 265 informing the user that a system condition exists. For example, in addition to or instead of the diagnostic information, the notification may include an instruction for the user to contact the customer service agent when the local repair operation could not remedy the system condition. The notification may include contact information that may enable the user to communicate, via telephone, electronic messaging, etc., with the customer service agent.

In yet another implementation, the user may communicate with voice portal server 275 using a remote control device. For example, the user may contact voice portal server 275 by pressing a particular button on remote control 270 (e.g., click-to-call), based on the system notification displayed by video display device 265. Video client 260 may provide the quick code information and/or information associated with the user to voice portal server 275. Voice portal server 275 may authenticate video client 260 by verifying that the information associated with video client 260 matches information associated with video client 260 stored in a memory (e.g., quick code database 280 or some other memory associated with voice portal server 275). Voice portal 275 may forward the communication to the customer service agent and may populate a display, of the customer service agent, with diagnostic information and information associated with the user to inform the customer service agent of the condition associated video client 260.

Figure 5:
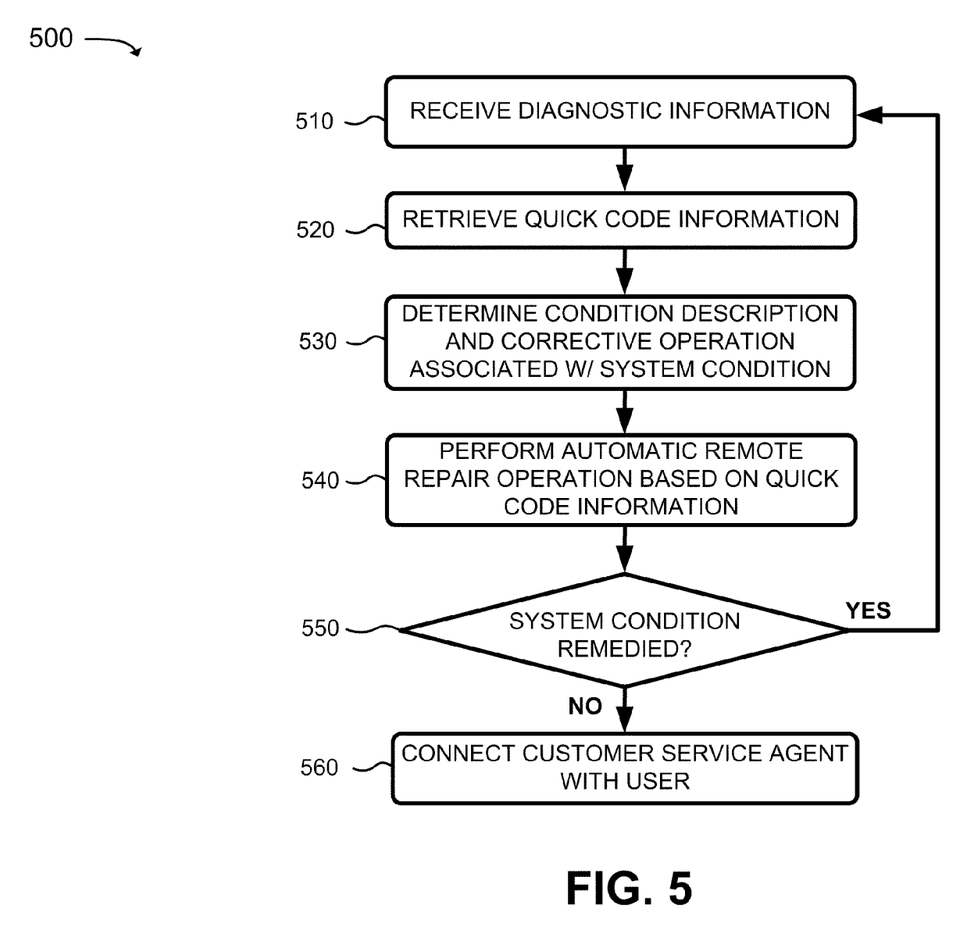
FIG. 5 is a flowchart of an exemplary process for an automatic remote repair operation within an exemplary portion of the network of FIG. 2.
Figure 6:
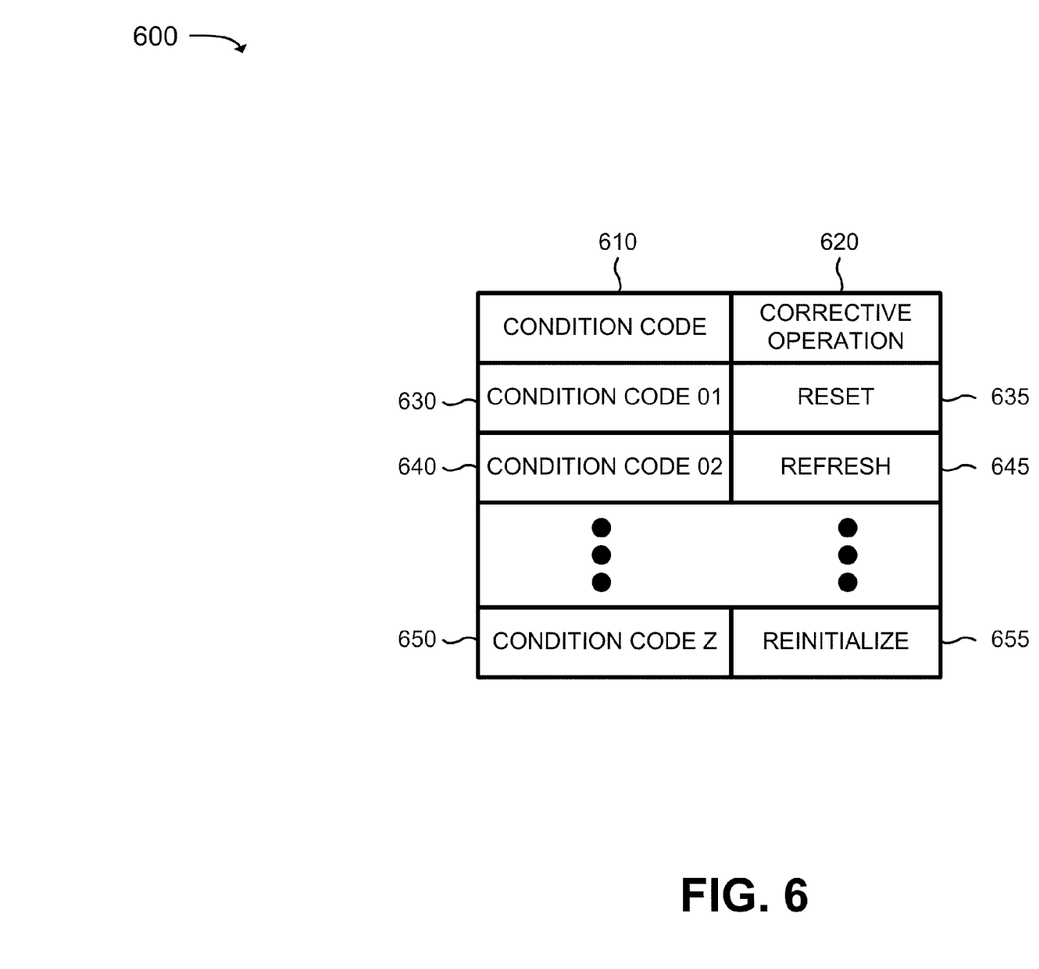
FIG. 6 is a diagram that illustrates exemplary quick code information capable of being used within the network of FIG. 2.

FIG. 5 is a flowchart of an exemplary process 500 for an automatic remote repair operation within an exemplary portion of environment 200. In one implementation, some or all of process 500 may be performed by voice portal server 275 interfacing with quick code database 280, content delivery system 255, video client 260, network 285 and/or other exemplary portions of environment 200. In another implementation, some or all of process 500 may be performed by one or more devices separate from, or in combination with, voice portal server 275. FIG. 6 is a diagram that illustrates exemplary quick code information 600 capable of being used by environment 200. Process 500, of FIG. 5, will be discussed below with corresponding references to FIG. 6.

Process 500 may include receiving diagnostic information (block 510). For example, voice portal server 275 may receive diagnostic information, from video client 260, associated with a system condition detected as a result of an automatic diagnostic operation, as described above with respect to blocks 420 through 470 of FIG. 4. The diagnostic information may include quick code information (e.g., information regarding the channel or the set of channels with which the system condition is associated and/or condition code information associated with the system condition description), information associated with video client 260 (e.g., device number, user information, such as username, password, PIN, telephone number, etc.). Voice portal server 275 may authenticate video client 260 by verifying that the information associated with video client 260 matches information associated with video client 260 stored in a memory (e.g., quick code database 280 or some other memory associated with voice portal server 275).

Quick code information may be retrieved (block 520). For example, voice portal server 275 may receive the diagnostic information from video client 260 and the voice portal application may retrieve quick code information from quick code database 280.

As illustrated in FIG. 6, quick code information 600 may include condition code field 610 and/or corrective operation field 620. Condition code field 610 may include information associated with a system condition that is detected as a result of an automatic diagnostic operation performed by video client 260. Corrective operation field 620 may include an indicator of the type of corrective action and/or operation that may be performed, by voice portal server 275, to remedy the system condition.

While FIG. 6 illustrates quick code information fields that include a condition code field 610 and a corrective operation field 620, in another implementation, quick code information may include fewer fields, additional fields, different fields, or differently arranged fields than are described in FIG. 6. Additionally, or alternatively, although FIG. 6 depicts corrective operations that include a reset operation, a refresh operation, and a reinitialize operation, in another implementation, there may be fewer corrective operations, additional corrective operations, and/or different corrective operations. For example, a corrective operation may include performing a power cycle operation. In another example, multiple corrective operations (e.g., power cycle, reset, refresh, reinitialize, etc.) may be performed to remedy a particular system condition In still another example, a corrective operation may include performing an operation to reestablish a network connection, to reacquire a channel or set of channels, and/or other corrective operations associated with video client 260.

The condition description and the corrective operation associated with the condition code may be determined (block 530). For example, the voice portal application may determine, from the diagnostic information, that condition code 01 (e.g., field 630 of FIG. 6) was assigned to the system condition. The voice portal application may use the quick code information to determine that condition code 01 corresponds a reset operation (e.g., field 635 of FIG. 6) that may be performed to remedy the system condition associated with condition code 01.

In another example, the voice portal application may determine, from the diagnostic information, that condition code 02 (e.g., field 640 of FIG. 6) was assigned to the system condition. The voice portal application may use the quick code information to determine that condition code 02 corresponds to a refresh operation (e.g., field 645 of FIG. 6) that may be performed to remedy the system condition associated with condition code 02.

In yet another example, the voice portal application may determine, from the diagnostic information, that condition code Z (field 650 of FIG. 6) was assigned to the system condition. The voice portal application may use the quick code information to determine that condition code Z corresponds to a reinitialize operation (e.g., field 655 of FIG. 6) that may be performed to remedy the system condition associated with condition code Z.

In still another example, the voice portal application may use the quick code information to determine that one or more of the condition codes (e.g., condition codes 01, 02, . . . , Z) correspond to an operation to reestablish a network connection between content delivery system 255 and video client 260 and/or an operation to enable video client 260 to reacquire a channel or set of channels.

An automatic remote repair operation may be performed based on the quick code information (block 540). For example, the voice portal application may send an instruction to video client 260, via content delivery system 255, to perform a reset operation based on the determination that condition code 01 (e.g., field 630 of FIG. 6) corresponds to a reset corrective operation (e.g., field 635 of FIG. 6). Video client 260 may perform the reset operation by clearing the memory of user preferences, resetting video client 260 parameters to default values, performing a power cycle operation, and/or performing other reset operations.

In another example, the voice portal application may send an instruction to video client 260, via content delivery system 255, to perform a refresh operation based on the determination that condition code 02 (e.g., field 640 of FIG. 6) corresponds to a refresh corrective operation (e.g., field 645 of FIG. 6). Voice portal server 275 may send updated system parameters, updated software versions, and/or update software patches to video client 260, via content delivery system 255. Additionally, or alternatively, the voice portal application may instruct video client 260 to perform a power cycle operation and/or to perform other refresh operations.

In yet another example, the voice portal application may send an instruction to video client 260, via content delivery system 255, to perform a reinitialize operation based on the determination that condition code Z (e.g., field 650 of FIG. 6) corresponds to a reinitialize operation (e.g., 655 of FIG. 6). The voice portal application may send an instruction to video client 260, via content delivery system 255, to clear the memory of user preferences, reinstall software, reset system parameters to system default values, perform a power cycle operation, and/or to perform other reinitialize operations. Additionally, or alternatively, the voice portal application may send, via content delivery system 255, new system parameters and/or new software to replace existing software on video client 260.

In still another example, the voice portal application may communicate with content delivery system 255 and/or video client 260 to determine whether a network connection can be reestablished between content delivery system 255 and/or video client 260 based on the determination that on one or more condition codes corresponds to an operation to reestablish a network connection. Additionally, or alternatively, the voice portal application may communicate with content delivery system 255 and/or video client 260 to determine whether a channel or a set of channels can be reacquired by video client 260 based on the determination that one or more condition codes corresponds to an operation to reacquire the channel or the set of channels determined, at a prior point in time, to be included on the out-of-service list.

If the system condition is remedied (block 550—YES), then other diagnostic information may be received (block 510). For example, if the voice portal application determines that the system condition has been remedied by one or more of the corrective operations (e.g., reset, refresh, reinitialize, etc.), then voice portal server 275 may receive other diagnostic information and/or process 500 may end.

If the system condition is not remedied (block 550—NO), then a customer service agent may be connected with the user (block 560). For example, if the voice portal application determines that the system condition was not remedied by the automatic remote repair operation, then the voice portal application may send a notification to video client 260 via content delivery system 255.

In one implementation, a customer service agent may communicate with a user of video client 260 when the automatic remote repair operation does not remedy the system condition associated with video client 260. For example, voice portal server 275 may retrieve contact information associated with the user of video client 260 based on information associated with video client 260 obtained from the diagnostic information. Voice portal server 275 may automatically establish a connection between the user of video client 260 and a customer service agent, associated with voice portal server 275, to enable the user and the customer service agent to communicate (e.g., via telephone, electronic messaging, etc.). Voice portal server 275 may populate a display, associated with the customer service agent, with diagnostic information and information associated with the user to inform the customer service agent of the condition associated video client 260.

In another implementation, voice portal server 275 may receive a communication (e.g., via telephone, electronic messaging, etc.) from the user of video client 260 associated with the system condition. Voice portal server 275 may forward the communication to the customer service agent and may populate the display, of the customer service agent, with diagnostic information and information associated with the user to inform the customer service agent of the condition associated video client 260.

In yet another implementation, voice portal server 275 may receive a communication from the user of video client 260. For example, the user may communicate with voice portal server 275 by pressing a particular button on remote control 270 (e.g., click-to-call), based on the system notification displayed by video display device 265. The user may be prompted, by voice portal server 275 to provide the quick code information (e.g., displayed by video display device 265) and/or information associated with the user. Voice portal server 275 may authenticate video client 260 by verifying that the information associated with video client 260 matches information associated with video client 260 stored in a memory (e.g., quick code database 280 or some other memory associated with voice portal server 275).

In still another implementation, a customer service agent may communicate with a user of video client 260 when the diagnostic information is received and before or instead of performing an automatic remote repair operation. For example, a customer service agent may communicate with the user of video client 260 when the local repair operation does not remedy the system condition and diagnostic information, associated with the system condition, is received from video client 260. Voice portal server 275 may retrieve contact information associated with the user of video client 260 based on information associated with video client 260 obtained from the diagnostic information. Voice portal server 275 may automatically establish a connection between the user of video client 260 and a customer service agent, associated with voice portal server 275, to enable the user and the customer service agent to communicate (e.g., via telephone, electronic messaging, etc.). Voice portal server 275 may populate a display, associated with the customer service agent, with diagnostic information and information associated with the user to inform the customer service agent of the condition associated video client 260.

Implementations described herein may provide an automatic detection and local/remote repair of a television system condition. A menu guide application may perform an automatic diagnostic operation to determine whether a system condition exists. The menu guide may perform an automatic local repair operation to remedy the system condition and may forward information associated with the system condition to a voice portal if the local repair operation does not remedy the system condition. The voice portal may receive the information associated with the system condition and a voice portal application may automatically perform a remote repair operation to remedy the system condition without involving the user and/or the customer service agent in detecting, troubleshooting or remedying the system condition.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4 and 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    storing, by a server device, code information,
        the code information including information identifying a plurality of corrective operations and a plurality of condition codes corresponding to the plurality of corrective operations;
    receiving, by the server device and from a video client, diagnostic information after the video client determines that an automatic local repair operation did not remedy a condition associated with the video client,
        the diagnostic information including a condition code that corresponds to the condition associated with the video client;
    determining, by the server device, that the condition code matches a particular condition code of the plurality of condition codes;
    determining, by the server device, a particular corrective operation, of the plurality of corrective operations, that corresponds to the particular condition code;
    performing, by the server device and based on the particular corrective operation, an automatic remote repair operation to remedy the condition associated with the video client;
    determining, by the server device, that the automatic repair operation remedied the condition; and
    sending, by the server device and to the video client, a notification that indicates that the condition has been remedied after determining that the automatic remote repair operation remedied the condition.

2. The method of claim 1, further comprising:
    obtaining information associated with the condition from the diagnostic information,
    communicating, based on the information associated with the condition, with a content delivery system to determine that the condition cannot be remedied by the content delivery system, and
    sending, to the video client, another notification indicating that the particular condition cannot be remedied by the content delivery system.

3. The method of claim 1, where determining the particular corrective operation includes:
    identifying that the particular corrective operation corresponds to a reset operation when the particular condition code matches a first condition code,
    identifying that the particular corrective operation corresponds to a refresh operation when the particular condition code matches a second condition code, and
    identifying that the particular corrective operation corresponds to a reinitialize operation when the particular condition code matches a third condition code.

4. The method of claim 1, where performing the automatic remote repair operation includes:
    generating a first instruction to:
        clear user preferences from the video client,
        reset device parameters to default values in the video client, or
        perform a power cycle operation by the video client, and
            sending, to the video client, the first instruction.

5. The method of claim 1, where performing the automatic remote repair operation includes:
    obtaining updated device parameters or updated software patches when the particular corrective operation is a refresh operation, and sending the updated device parameters or the updated software patches to the video client.

6. The method of claim 1, where performing the automatic remote repair operation includes:
obtaining new device parameters or new software when the particular corrective operation is a reinitialize operation, and
sending, to the video client, the new device parameters to replace existing device parameters on the video client or the new software to replace existing software on the video client.

7. The method of claim 1, further comprising:
determining that another automatic remote repair operation did not remedy another condition associated with another video client, and
sending, to the other video client, another notification informing a user of the other video client that the other condition exists,
the other notification including another condition code and a request for the other user of the other video client to call a telephone number associated with a customer service agent associated with the server device.

8. A video client device comprising:
a processor to:
perform a diagnostic operation to determine that a particular condition exists,
perform an automatic local repair operation to remedy the particular condition,
determine that the automatic local repair operation did not remedy the particular condition,
provide, for display and after determining that the automatic local repair operation did not remedy the particular condition, a notification informing a user of the video client device that the particular condition exists,
identify, based on information associated with a plurality of conditions, a particular condition code, of a plurality of condition codes, after determining that the automatic local repair operation did not remedy the particular condition,
the particular condition code corresponding to a condition, of the plurality of conditions, that matches the particular condition, and send, to a server device, a notification t regarding the particular condition,
the notification including:
the particular condition code, and
information regarding the video client device or a user of the video client device, and
the particular condition code being used by the server device to perform an automatic remote repair operation to remedy the particular condition.

9. The video client device of claim 8, where, when performing the diagnostic operation, the processor is to:
perform a self-diagnostic test on the video client device to determine whether one or more functions of the video client device are being performed properly, and
determine that the particular condition exists based on the self-diagnostic test.

10. The video client device of claim 8, where the diagnostic operation is an automatic diagnostic operation that is performed without involvement of the user of the video client device.

11. A system comprising:
a network device to:
store code information,
the code information including information identifying a plurality of corrective operations corresponding to a plurality of condition codes,
receive, from a video client, diagnostic information after the video client determines that an automatic local repair operation did not remedy a condition associated with the video client,
the diagnostic information including a particular condition code corresponding to the condition,
compare the particular condition code to the plurality of condition codes of the code information to identify a matching condition code of the plurality of condition codes,
identify, based on the code information, a particular corrective operation, of the plurality of corrective operations, that corresponds to the matching condition code,
perform, based on the particular corrective operation, an automatic remote repair operation to remedy the condition,
determine that the automatic repair operation remedied the condition, and
send, to the video client, a notification that indicates that the condition has been remedied after determining that the automatic remote repair operation remedied the condition.

12. The system of claim 11, where the video client is to:
determine that the video client is not functioning properly by performing a self-diagnostic test, and
determine that the condition exists based on determining that the video client is not functioning properly.

13. The system of claim 11, where the video client is to:
send, to a video display device associated with the video client, another notification notifying that the condition exists after determining that the automatic local repair operation did not remedy the condition.

14. The system of claim 11,
where the diagnostic information further includes information associated with a particular channel of a plurality of channels; and
where the network device is further to:
obtain the information associated with the particular channel from the diagnostic information,
determine that the particular channel is out-of-service by communicating with a content delivery system, and
send another notification, to the video client, indicating that the particular channel is out-of-service after determining that the particular channel is out-of-service.

15. The system of claim 11, where, when identifying the particular corrective operation, the network device is to:
identify that the particular corrective operation corresponds to a reset operation when the particular condition code matches a first condition code,
identify that the particular corrective operation corresponds to a refresh operation when the particular condition code matches a second condition code, or
identify that the particular corrective operation corresponds to a reinitialize operation when the particular condition code matches a third condition code.

16. The system of claim 11, where, when performing the automatic remote repair operation to remedy the condition, the network device is to:

generate, when the particular corrective operation is a reset operation, a first instruction to clear user preferences from the video client, reset device parameters to default values in the video client, or perform a power cycle operation by the video client, and send, to the video client, the first instruction to clear the user preferences, to reset the device parameters to the default values, or to perform the power cycle operation.

17. The system of claim 11, where, when performing the automatic remote repair operation to remedy the condition, the network device is to:

obtain updated device parameters or updated software patches when the particular corrective operation is a refresh operation, and send the updated device parameters or the updated software patches to the video client.

18. The system of claim 11, where, when performing the automatic remote repair operation to remedy the condition, the network device is to:

obtain new device parameters or new software when the particular corrective operation is a reinitialize operation, and send, to the video client, the new device parameters to replace existing device parameters on the video client or the new software to replace existing software on the video client.

19. The system of claim 11, where the network device is further to:

receive, from the video client, other diagnostic information, the other diagnostic information including:

another condition code, of the plurality of condition codes, corresponding to another condition associated with the video client, and information associated with the video client or the user of the video client, determine that another automatic remote repair operation cannot remedy the other condition, retrieve first contact information, corresponding to the user, based on the information associated with the video client or the user of the video client, retrieve second contact information corresponding to a customer service agent associated with the network device, and establish communication between the user and the customer service agent based on the first contact information and the second contact information after determining that the other automatic remote repair operation cannot remedy the other condition.

20. The system of claim 19, where the network device is further to:

retrieve information associated with the user based on the information associated with the video client or the user of the video client, and populate a display, associated with a customer service agent associated with the network device, with information regarding the other condition and the information associated with the user.

21. A system comprising:

a server device to:

store code information that includes a plurality of corrective operations corresponding to a plurality of condition codes, receive, from a video client and after the video client determines that an automatic local repair operation did not remedy a condition associated with the video client, diagnostic information that is determined without involvement of a user of the video client, the diagnostic information including:

a particular condition code corresponding to the condition associated with the video client, and information identifying a particular channel that is associated with the condition, identify, based on the code information, a particular corrective operation, of the plurality of corrective operations, corresponding to the particular condition code of the plurality of condition codes, and perform an automatic remote repair operation to remedy the condition associated with the video client based on the particular corrective operation and the information identifying the particular channel.

22. The system of claim 21, where, when performing the automatic remote repair operation, the server device is to:

transmit, based on the particular corrective operation, a message to a content delivery system to determine whether the particular channel can be reacquired by the video client, receive a return message from the content delivery system, and send a notification to the video client indicating that the channel cannot be reacquired when the return message indicates that the particular channel cannot be reacquired.

23. The system of claim 21, where, when identifying the particular corrective operation, the server device is to:

identify that the particular corrective operation corresponds to a reset operation when the particular condition code matches a first condition code, identify that the particular corrective operation corresponds to a refresh operation when the particular condition code matches a second condition code, or identify that the particular corrective operation corresponds to a reinitialize operation when the particular condition code matches a third condition code.

24. The system of claim 21, where the server device is further to:

receive other diagnostic information from the video client, the other diagnostic information including:

another condition code corresponding to another condition associated with the video client, and information associated with the video client or the user of the video client, retrieve first contact information corresponding to the user of the video client based on the information associated with the video client or the user of the video client, retrieve second contact information corresponding to a customer service agent associated with the server device, determine that another automatic repair operation cannot remedy the other condition, and establish communication between the user and the customer service agent, based on the first contact information and the second contact information, after determining that the other automatic remote repair operation cannot remedy the other condition.

25. The system of claim 24, where the server device is further to:

retrieve information associated with the user based on the information associated with the video client or the user of the video client, and populate a display, associated with a customer service agent associated with the server device, with information regarding the other condition and the information associated with the user.

* * * * *